(12) United States Patent
Buys et al.

(10) Patent No.: US 12,438,961 B2
(45) Date of Patent: Oct. 7, 2025

(54) NETWORK PROTOCOL FOR COMMUNICATION AMONG LIGHTING AND OTHER DEVICES

(71) Applicant: ArKaos S.A., Waterloo (BE)

(72) Inventors: Koen Buys, Waterloo (BE); Pete Goodliffe, Waterloo (BE); Benjamin Bauwens, Waterloo (BE)

(73) Assignee: ArKaos S.A., Waterloo (BE)

( * ) Notice: Subject to any disclaimer, the term of this patent is extended or adjusted under 35 U.S.C. 154(b) by 463 days.

(21) Appl. No.: 17/890,741

(22) Filed: Aug. 18, 2022

(65) Prior Publication Data

US 2023/0057962 A1 Feb. 23, 2023

Related U.S. Application Data

(60) Provisional application No. 63/234,404, filed on Aug. 18, 2021.

(51) Int. Cl.
*H04L 69/00* (2022.01)
*G05B 13/02* (2006.01)
*H04L 41/08* (2022.01)
*H04L 41/0806* (2022.01)
*H04L 69/18* (2022.01)

(52) U.S. Cl.
CPC ............ *H04L 69/26* (2013.01); *G05B 13/024* (2013.01); *H04L 41/0806* (2013.01); *H04L 41/0886* (2013.01); *H04L 69/18* (2013.01)

(58) Field of Classification Search
None
See application file for complete search history.

(56) References Cited

U.S. PATENT DOCUMENTS

| | | | | |
|---|---|---|---|---|
| 6,507,158 B1* | 1/2003 | Wang | ..................... | H05B 47/18 315/294 |
| 2004/0123091 A1* | 6/2004 | Das | ......................... | H04L 9/40 713/2 |
| 2006/0200605 A1* | 9/2006 | Hatamori | ............. | G06F 13/4291 710/110 |
| 2016/0205746 A1* | 7/2016 | Kumar | .................... | H05B 45/14 315/297 |
| 2017/0185278 A1* | 6/2017 | Sundermeyer | ...... | H04L 12/2818 |
| 2019/0166011 A1* | 5/2019 | Cordray | ................ | G06F 15/173 |
| 2020/0127891 A9* | 4/2020 | Johnson | ................ | H04L 67/141 |
| 2020/0275544 A1* | 8/2020 | Guan | ..................... | H05B 47/10 |

* cited by examiner

*Primary Examiner* — Kidest Bahta
(74) *Attorney, Agent, or Firm* — ARENTFOX SCHIFF LLP

(57) ABSTRACT

A protocol for controlling lighting devices within a network enables bidirectional communication between different connected devices, any of which may function as a server, a device, a broker, or multiple of these roles. Upon initialization of the network, a server device requests a basic configuration data file from each device on the network and, thereafter, requests a more extensive configuration data file identifying capabilities and functionalities of the device which the manufacturer has made discoverable. Each device sends its basic configuration file to the server device upon any of power on, reboot, reset, hardware configuration change, or software change to the respective device. A device on the network can also be a collection of sub-devices each of which may be separately identified, and their respective capabilities evaluated, so that the server can separately control either the device or any of the individual sub-devices.

15 Claims, 11 Drawing Sheets

US 12,438,961 B2

NETWORK PROTOCOL FOR COMMUNICATION AMONG LIGHTING AND OTHER DEVICES

FIELD OF THE DISCLOSURE

The disclosure relates to equipment for the control, configuration and distribution of data to remote lighting and other devices, and feedback information from such devices.

BACKGROUND OF THE DISCLOSURE

In the events and entertainment industry, lighting devices are used to display lighting images or parts of lighting images to enhance the audience experience. The lighting images can be supplied by sources such as media servers. Lighting data is fed into a variety of lighting devices such as lighting projectors, LCD screens, LED screens and digital lighting fixtures, using a certain physical and logical communication system.

In prior art systems, the lighting data may be transported over a variety of communication channels each requiring its own physical, electrical and logical interface. At the present time, multiple communication protocols, communication technologies and communication interfaces may be used to connect the source to the different lighting devices. Display device manufacturers often implement their own vendor specific protocols to transport lighting data from the source to the display device.

The Digital Multiplex (DMX) protocol was one of the first protocols to provide limited control of remote lighting fixtures. The DMX protocol requires mapping over an intermediate value set, e.g. everything is mapped to 8, 16 or 24 bit range. Because of the physical limitations of the DMX cabling, other protocols were developed which allowed DMX to be implemented over Ethernet networks, including sACN, and Artnet.

It is more common than not that a variety of brands and types of lighting devices are brought together for an event. Because these mixed systems may require a plurality of different protocols, technologies and interfaces, set up and operation of such mixed systems can be complex and often result in conflicting communication, lack of coordinated response, excessive trouble shooting, customization, tweaking and difficulty in operating consistently.

In the prior art, each manufacturer of lighting devices may have its own dedicated and specialized physical and logical convertors to convert the signals for the lighting devices. These convertors are expensive and when a set-up requires convertors of different manufacturers, may increase the cost and complexity of the whole project drastically. These setups can also result in problematic operation where coordinated control is necessary.

In the end, the different communication systems, methods and devices cause less usability and higher costs for the user. For the system integrator, operator and technicians that must build, manage and operate the setup, this makes it an expensive job with high complexity and increased risk of failure.

It is further known to use a media server such as the ArKaos MediaMaster to generate custom lighting signals targeted to a specific lighting device. However, such systems often do not use a common distribution network for multiple lighting devices or do not bi-directionally communicate with the lighting device to establish the format of the signal needed.

Accordingly, a need exists for a protocol which enable bidirectional communication between multiple different lighting fixtures having different functional parameters and one or more steering consoles from which content and control signals may be distributed as appropriate.

Accordingly, a need exists for a protocol which does not have the physical limitations of requiring mapping over an intermediate value set, e.g. everything is mapped to 8, 16 or 24 bit range.

Accordingly a still further need exists for a next generation lighting protocol capable of working with lighting fixtures and controllers from multiple manufacturers and which can be implemented efficiently enough to include in AVR, PIC, STM, LPC and similar elementary microcontrollers to allow for multiple optional of parameters.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein.

SUMMARY OF THE DISCLOSURE

Figure 1:
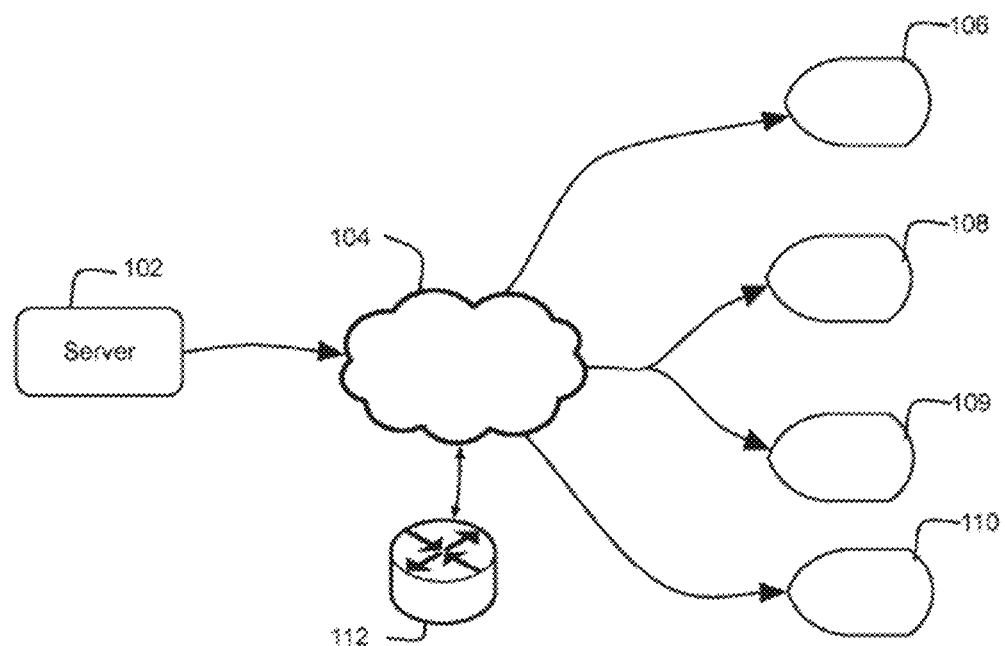
FIG. 1 illustrates an exemplary embodiment of a networked set-up of the control server and lighting devices.

The disclosed protocol addresses the problems caused by multiple different, communication means between a lighting content source and lighting fixture devices, reduce the complexity of the different lighting systems and, by doing this, decreasing the overall cost of the system, system set-up, take-down and operation.

The disclosed protocol provides a method and system for controlling, configuring, updating and distribution of lighting data to a wide variety of local or remote devices over a local area network or a remote WAN. The lighting data comprises the control information to be displayed/consumed by the fixture device and is independent of the target device and its properties. The data will be created and prepared by the server steering console such that low-cost lighting devices with little processing power can also consume the data with minimal processing.

The network protocol, which may be implemented by entertainment device manufacturers, is intended to support a broad spectrum of devices, like media servers, lighting devices, fountains, lasers, pyro-technics, video switches, beamers, etc. The protocol will support the most common properties and characteristics of the devices and leave room for future expansion of extra properties.

One advantage is that the above-mentioned complexity with set-ups of different lighting sources and lighting devices will be avoided because it provides one common protocol. Another advantage is that the protocol will allow for less expensive, very basic lighting devices that have little or no lighting processing capability of their own as the server will do the processing for them. Both advantages result in easy configuration and setup with, if preferred, inexpensive lighting devices, also lowering the total cost of the equipment, set-up and operation of the system.

According to one aspect of the disclosure, a protocol for controlling lighting devices within a network enables bidirectional communication between different connected elements, any of which may function as a server, a device or a broker, or multiple of these roles. More specifically, upon initialization of the network, a plurality of the devices go through an auto configuration protocol in which a server requests an initial basic set of configuration data from each device on the network and, thereafter, requests a more extensive set of configuration data identifying capabilities and functionalities of the device which the manufacturer has made discoverable. In this matter, the server is able to efficiently identify all capabilities of all devices within the network. In embodiments, each device will send its basic configuration and file to the server upon any of power on, reboot, reset, hardware configuration change (mode change, setting directly on the display of the device, etc.), and software change to the device. A device on the network may actually be a collection of sub-devices each of which may be separately identified, and their respective capabilities evaluated, so that the server can separately control the device or individually any of the sub-devices using the dual configuration file protocol disclosed herein.

According to one aspect of the disclosed protocol, a lighting fixture provides all control information to the steering console, including data identifying its functionality, control channels and protocols as well as its geometry, physical properties and functionality.

According to another aspect of the disclosed protocol, a lighting fixture stores additional data on board such as optical files, emitter spectral power distribution data, etc.

According to yet another aspect of the disclosed protocol, a lighting fixture can store notes from the user input from the steering console. For example, a user in the field can report the use or defects to the rental house so that they have information on the individual lighting fixture device when they do a quality check or repair. As another example, notes of the usage of the light fixture in a show can be stored on board the fixture, so that when someone takes over the show, they can understand the logic/intent of the original programmer.

According to yet another aspect of the disclosed protocol, the user can assign meta tags to a fixture and which meta tags are stored on the fixture. These meta tags can be used to create groups, indicate function and can be parsed to have a show choreography created automatically. For example, if a fixture has both the tags "front" and "profile" these can be used to put a subject performer in the spotlight for a certain part of the show. If an additional feature is hung with the same meta-tags, such feature can be automatically included in that part of the choreography.

According to another aspect of the disclosure, the protocol can be transparently used for control within a local network or over the internet.

According to another aspect of the disclosure, the protocol provides a direct correlation between control parameters and variables and the device capabilities without the physical limitation of having to map that everything over an intermediate value set, e.g. everything mapped to 8, 16 or 24 bit range, like DMX requires.

According to still another aspect of the disclosure, an auto configuring lighting control system comprises: a plurality of devices operatively coupled over a network infrastructure, the plurality of devices each configured to operate in a zero configuration mode and further configured to store: a restricted configuration file containing data identifying the device, and a complete configuration file containing data identifying the device and one or more controllable parameters of the device, and wherein a first of the plurality of devices is configured as a server source of control data and content data for others of the plurality of devices, wherein the first of the plurality of devices configured as the server source periodically requests the others of the plurality of devices to provide a respective restricted configuration file and complete configuration file.

According to still another aspect of the disclosure, an auto configuring lighting control device comprising a processor and a non-transitory computer-readable storage medium storing instruction that, when executed by the processor, cause the processor to perform a method, the method comprising: store a restricted configuration file containing data identifying the device; store a complete configuration file containing data identifying the device and one or more controllable parameters of the device; provide the restricted configuration file to a server process automatically upon the occurrence of any of power on, reboot, reset, hardware configuration change, mode change, or software change to the respective device; and provide the restricted configuration file to the server process upon of a query from the server process.

According to yet another aspect of the disclosure, an auto configuring lighting control system comprises: a plurality of devices operatively coupled over a network infrastructure, the plurality of devices each configured to operate in a zero configuration mode; a first of the plurality of devices is configured as a server source of control data and content data for others of the plurality of devices; at least one of the other of the plurality of devices comprises a multifunction device having plural separately controllable sub-devices associated therewith, each sub-device having respective one or more controllable parameters; and wherein the server source is capable of controlling at least one parameter of one of the sub-devices independently of others of the sub-devices.

DETAILED DESCRIPTION OF THE DISCLOSURE

The present disclosure will be more completely understood through the following description, which should be read in conjunction with the drawings. In this description, like numbers refer to similar elements within various embodiments of the present disclosure. The skilled artisan will readily appreciate that the methods, apparatus and systems described herein are merely exemplary and that variations can be made without departing from the spirit and scope of the disclosure. The terms comprise, include, and/or plural forms of each are open ended and include the listed parts and can include additional parts that are not listed. The term and/or is open ended and includes one or more of the listed parts and combinations of the listed parts.

Embodiments of the present disclosure are illustrated in the Figures, like numerals being used to refer to like and corresponding parts of the various drawings.

In embodiments, the new lighting protocol is presented that it is useful for all brands of lighting fixtures and media servers. In embodiments, the new protocol may have a lightweight implementation so that it can be enough to include in AVR, PIC, STM, LPC like microcontrollers, allowing for additional optional parameters.

The present disclosure generally relates to a communication protocol, specifically to a communication protocol for the distribution of data to lighting devices. The protocol is constructed such that there is no limitation on the type, size, resolution, structure and manufacturer of the display device.

In embodiments, the protocol may also be implemented with lighting devices with limited processing power, memory and software. This way, the protocol can also be implemented on small-scale, inexpensive, lighting devices, as well as more expensive and sophisticated one.

The network protocol provides a method for easy configuration that makes it possible to easily add, remove and change lighting devices and to configure and set-up said lighting devices with the least possible manual configuration work and to provide a generic method to distribute lighting data to all the lighting devices.

The disclosed lighting protocol provides significantly more functionality and efficiency. The protocol can be used for lighting control to provide video professionals the ability to distribute real-time video data to LED strips, LED panels and other remote devices over Ethernet. The protocol automatically configures and connects display devices to a computer, media server or console, adding "intelligence" to LED devices, enabling them to communicate directly to the server or console, without the user's input. Some of the main benefits of such autoconfiguration functionality is that it eliminates the complexity of networking and control issues, thereby reducing the need for technical knowledge of the user, and allows the creation of a heterogenic network of display devices from different manufacturers, which can all be controlled from one or more computer, media server or console. The autoconfiguration capabilities of disclose protocol ensure that many different devices can be controlled by the same media server and avoids creating and matching the profiles of media server and individual lighting device The lighting protocol disclosed herein includes features previously not available together in an existing protocol, including the following:
- Auto Discovery and Remote Configuration & Control
    - Enables users to automatically remotely discover, configure and control fixtures.
    - Control of every feature
        - Movement
        - Color
        - Built-in FX (Strobe, Gobos, Prism, etc)
        - Intensity/Brightness/Dimming
    - Wireless & Wired Functionality
        - Both Wireless and Wired Connections can be offered
            - Wired=Installed systems with low latency
            - Wireless=Mobile & home easy setup
    - Low latency
        - 20 Hz minimum
    - Over the Air Updates
        - Being able to push updates to the fixture's chipsets from software
    - Standard Fixture Definition and Channel order
    - Pixel Mapping and Arrangement Detection
        - Similar to Nanoleafs ability to detect the arrangement of the panels but at a pixel level
        - Wired and Radio based Position for Relative Position Data—The ability for fixtures to know where they are relative to other fixtures in the setup The improved lighting protocol disclosed herein includes features previously not available together in an existing protocol, including the following:
Model of the lighting device in the protocol supports functionality for the following:
  2D and 3D model
  Full and reduced mesh model
  Kinematic chains
  Real-world and abstract dimensions for geometry
  Multi-modal fixtures such as wash fixture with additional strobe or a spotlight fixture with a wash halo
  All beam parameters for volumetric rendering: gobo, prism, iris, fx wheel, frost, softedge, beam shaper, zoom, . . .
  Color control with different color spaces
  Control within the protocol supports:
  All parameters
  Direct fixture control (not encapsulate other protocol)
  Partial fixture control both:
    over the lighting protocol from different sources, e.g. dimmer controlled by control console A and color controlled by control console B.
    hybrid, e.g. mapping only color from the protocol, other values come from DMX on a light console
  Standardize parameter naming
  Dynamic switching, (cross) fade of different operation modes, e.g. washlight control vs pixel control, color space switching, pixel mapping control vs full fixture control
Configuration
  Remote configuration options
    Allow for remote IP setting and any other setting
    Allow for OTA SW updates
  Allow for device setup without display requirement on the device, reducing cost
Communication
  Standardized auto-discovery protocol
  Communicate/host fixture personalities for other control protocols
    DMX, sACN, Artnet, NDI, . . . compatibility
  Communicate generic GDTF personality
  Host personalities for specific light consoles
  Serve additional data over FTP or HTTP
  Support multiple network protocols.
    Allow for bulk DMX drops.
    Allow for delta DMX info.
    Allow for encapsulation of other protocols
  Supports fixed IP, DHCP, and server-based IP handout
  Works wireless (WIFI, Bluetooth, RF, . . . )
  Encrypted to allow usage supervision Allow for time synchronisation service.
  Allow for output synchronisation
  Allow for timecode distribution.
  Allow for a direct link with devices to the cloud, to get streaming data from a cloud service In embodiments, the protocol can work with large numbers of fixtures, e.g. +4000 fixtures, and at high refresh rates, e.g. >50 Hz. Further, in embodiments the protocol works seamless over a network with common entertainment protocols including any of sACN, Artnet, NDI, StageLinq, and others.

In embodiments of the disclosed protocol, any element on the network can serve as a server, a device or a broker, or one or more of these roles. A device is anything on a network that consumes data and may be a light device, or other system such as a parcan, a moving head, a laser system, a smoke machine, video wall, projector, pyrotechnics, water fountain, etc. A server is a system on the network that generates control data for devices and can be a Light Control system, Pixelmapping media server or other network element. Servers use commands to request information from a device. A broker is the communication manager on the lighting network and may be implemented as a MQTT Broker that supports, MQTT version 5.0 or higher. Typically the MQTT Broker may run on the same physical system as a Server process. However this can be split up from the server for multiple reasons:

Workload: a dedicated instance can process a higher workload

Network redundancy: the dedicated instance can contain multiple redundant NICs.

Communication redundancy: when run separate from the server, multiple brokers can either be configured in a passive or an active redundancy.

The Broker supports native MQTT topics in JSON and binary communication format as well direct WebSocket communication with the Broker.

Protocol Communication Phases

The disclosed protocol implements autoconfiguration of the network using a zero-configuration networking technologies that automatically create a usable computer network based on the Internet Protocol Suite (TCP/IP) when computers or network peripherals are interconnected. Such zero-configuration networking technologies are built on three core technologies: automatic assignment of numeric network addresses for networked devices, automatic distribution and resolution of computer hostnames, and automatic location of network services, such as printing devices. In embodiments, the zero-configuration networking may be implemented with the Avahi protocol. Avahi is a system which facilitates service discovery on a local network via the mDNS/DNS-SD protocol suite. Upon connection of a device to a network, Avahi enables instant viewing of other users, devices, shared files, etc.

The disclosed protocol supports the Rapid Spanning Tree Protocol (RTSP) to detect the network topology and to ensure correct usage of redundancy in the network.

In accordance with the improved protocol there are four primary communication phases between the server and the devices which occurs in the following phases:

Phase 1: Device discovery—the server finds all available devices on the network. In embodiments of the improved protocol, devices are automatically found on the local network/Wifi using the Avahi zero-configuration mDNS/DNS-SD protocol. Every protocol device will report itself on the local network as an Avahi service. This way each device can be discovered at any time by all others. Elements on a network in an implementing improved protocol or designated as follows:

Servers: '_klingnet3s._tcp'

Brokers: '_klingnet3b._tcp' with the port being the port of the MQTT broker

Clients: '_klingnet3d._tcp' or '_klingnet3c._tcp'

Phase 2: Capabilities Communication-a device will report to the server the base data as well as its optional information and capabilities.

Phase 3: Optional Information Communication—the server will request all additional information of the device; this can be over FTP or from a HTTP service on the device or from a cloud network location.

Phase 4: Device Control—the server sends out control commands to the device via MQTT topics.

Referring to FIG. 1, an illustrative example is provided of a network configuration utilizing the improved protocols. Server 102 may be a computer or any other physical or logical device that produces real-time lighting data that can be displayed by a lighting device. Lighting devices 106, 108, 109 and 110 are physical devices that are capable of converting lighting data to a visual representation and may be selected from a list including but not limited to: LCD screens, lighting projectors, LED screens, lighting fixtures. Lighting devices 106, 108, 109 and 110 may require device or system specific processing in hardware and/or software to do the convert of the lighting data to the desired visual representation.

The server 102 is connected using a wired or wireless connection to a network 104. Lighting devices 106, 108, 109 and 110 are also connected to the network 104 in a wired or wireless manner. The network 104 may be any computer network based on the IP network protocol stack (IPv4 and/or IPV6). In order to communicate with each other, the server 102 and the lighting devices 106, 108, 109 and 110 are preferably configured in the same network range. As is well known in the art, this can be done using static IP addresses or using a dynamic IP addressing system such as DHCP, or based on broadcast services. A network component 112 such as a router, a network switch or any other network device or service can be used to build the network.

In the illustration, the number of servers and lighting devices has been limited for explanatory reasons. The disclosed protocol does not limit the number of servers and lighting devices that may work together though the network 104.

Figure 2:
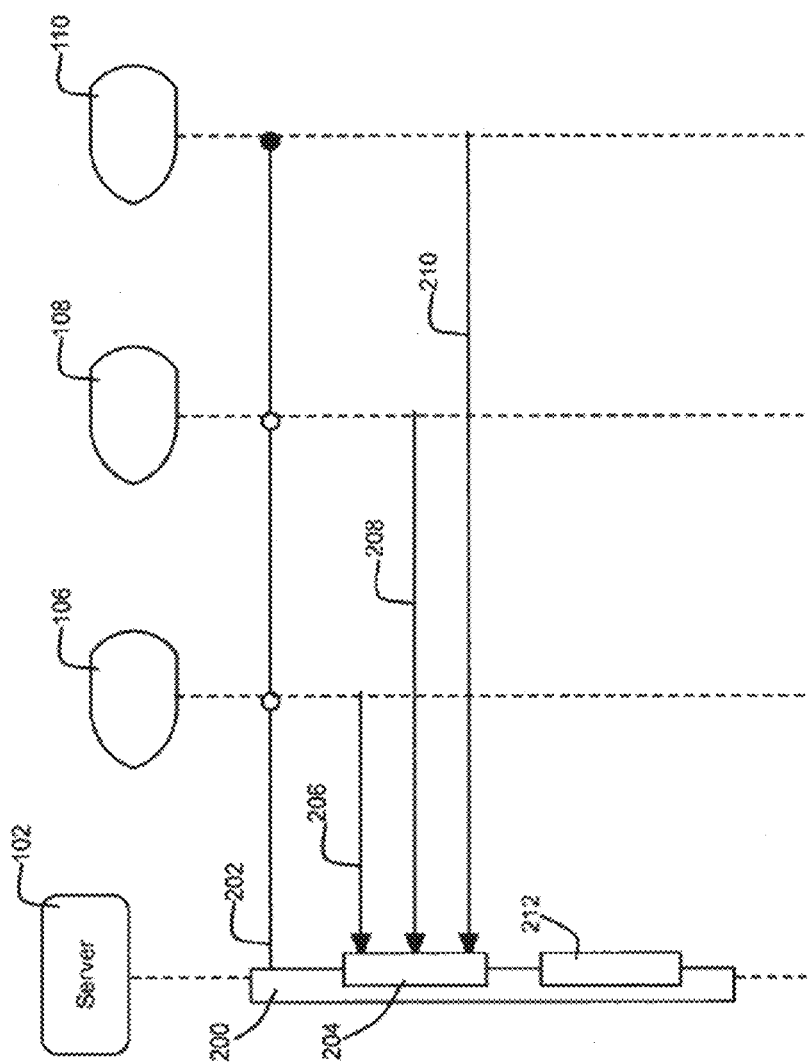
FIG. 2 illustrates conceptually a sequence diagram of the discovery process in accordance with the disclosure.

FIG. 2 depicts a communication sequence diagram for signal propagation during a discovery process 200 initiated by server 102 in search of connected lighting devices. Server 102 broadcasts a discovery message 202 over the network. The network manages the broadcasted message and makes sure every connected display device 106, 108 and 110 receives the broadcast discovery message 202. Upon receipt of discovery message 202, each display device 106, 108 and 110 individually answers with their specific discovery responses 206, 208 and 210 in a response phase 204.

In one embodiment of the disclosure server 102 performs a discovery of the lighting devices 106, 108 and 110 that are available in the network. Server 102 initially broadcasts a discovery message 202 over the network using a UDP broadcast message. Each display device that is listening for those broadcast messages will answer with a discovery response 206, 208 and 210. The discovery response comprises the reduced configuration file described below.

Configuration Files

In addition to a basic set of properties, each lighting device may also have extra properties that are not known in advance. These properties are discoverable with the improved protocol by the server via the use of both a reduced configuration file and a complete configuration file of the device. Specifically, according to one aspect of the improved protocol, devices on a network are identified during the device discovery process of Phase 1 with a Reduced Config File (RCF) and, during the capabilities communication processes of Phase 2 or Phase 3 with a more robust and extensive Complete Configuration File (CF). This dual configuration file implementation allows a device to provide updated information whenever its respective status changes (remotely or as well as locally/manually on the device) as well as to provide details of every aspect of the device which the respective manufacturer has made quantifiable for control thereof. In embodiments of the improved protocol, JavaScript Object Notation (JSON) format adhering to the RCF8259 standard is used for:
- Reduced Config File (RCF)
- Complete Config File (CCF).
- MQTT topic communication The main configuration files are sent when a device connects to the MQTT broker. The main configuration files list the available parameters of the device and their MQTT topics, as well as other physical properties. There are two files:
- Reduced Config File (RCF): this is sent out on the '/devices/announce' topic and makes sure that the servers can find the device roots.
- Complete Config File (CCF): this is located in the /devices/<Esta_Manuf_ID>/<Product_ID>/<Serial_ID>/config' topic, which is the Device Root Location or DRL, followed by/config Both the RCF and CCF files can also be made available by the manufacturer as device descriptors using a naming format as follows:
<manuf_name>_<esta_manuf_ID>_<product_ID>_rcf.json
<manuf_name>_<esta_manuf_ID>_<product_ID>_ccf.json The Message Queuing Telemetry Transport (MQTT) is a lightweight, network protocol that transports messages between devices. The protocol usually runs over TCP/IP; however, any network protocol that provides ordered, lossless, bi-directional connections can support MQTT's. The server sends out control commands to a device via MQTT topics during device control of Phase 4.

Reduced Config File (RCF)

The goal of the RCF file is to announce the presence of a device on the network and give the minimal information of the device to servers.
- Devices are required to send the RCF:
  - Each time they power on.
  - Each time they reboot
  - Each time they reset
  - Each time a hardware configuration was changed (mode change, setting directly on the display of the device, . . . )
  - Each time a new software was uploaded to the device
- Devices are required to subscribe to '/devices/ping' and send a response to '/devices/announce' every time a server sends a message to '/devices/ping'.

The RCF is in JSON format and contains the following data elements:
- Esta_Manuf_ID: the 16-bit value in hex of the ESTA Manufacturer ID.
- Product_ID: a string identifying the specific product type, this should not contain the Manufacturer name or ID, it is the task of the manufacturer to stay consistent in this naming.
- Serial_ID: the unique identifier of the device, its serial number, a MAC address can also be used as a unique identifier as long as the fixture only has a single MAC.
  - The same device shouldn't identify itself with two different serial IDs. (for example, when it has multiple NIC's)
  - The serial ID should be unique to a physical device and shouldn't be reused! (for example, when manufacturers would rotate serials)
- A GUID: Global Unique Identifier
- IP: This is a JSON array listing all IP addresses that the device currently has in use. Typically, only a single listing will be present, however devices can have both wired & WIFI connectivity or multiple wired connections. The first listing in the array should be the default communication channel, other listings are assumed to be fallback channels.
- Software Version: This is a string containing the current installed software format
- Protocol Version: This is a JSON array listing all supported protocol versions, starting with the most recent value first.

The discovery sequence of Phase 1 may be repeated as often as required or needed by the server or as previously outlined. Although the discovery process requires processing time and power, it may be preferred, or even necessary, to perform the discovery sequence at set regular intervals. For instance, repeatedly engaging the discovery process allows for the detection of newly connected lighting devices or to discover that lighting devices have been removed from the network or have otherwise become inaccessible.

Next the server 102 may query a newly discovered device 106 for its base data any optional information and capabilities in the Phase 2 of the protocol. Such information is provided through the Complete Configuration File of a particular device as described below.

Device Config File Overview

The hierarchical order of the device description concepts within the CCF of a device in accordance with the improved protocol is as follows:
- Device
  - Information
  - Parts
    - Compounds
      - Parameters
        - Variables
      - Cells: the optical apertures
        - Optical:
          - Photometrics
          - Horizontal/Vertical field angle
          - Aperture type/size
          - Parameters.
          - Variables
      - Emitters: the actual light sources
        - Information
          - Manufacturer
          - Power
          - ProductID
          - Spectral information/Photometrics
          - Parameters: intensity/color/strobe/lamp_control
          - Variables Complete Config File (CCF)

The CCF forwarded to the server by a device is in JSON format and contains the following sections, each of which is described below in greater detail:
- RCF
- Information
- Modes
- Topology
- Macros (optional)

Physical (optional)
Emitters (optional)
Parameters
Geometry (optional)
Status (optional)

RCF—The RCF section of the CCF JSON structure is a JSON block with the name "rcf" that contain the Reduced Config File.

Information—The Information section in the CCF includes information that is additional to the RCF is gathered. The information section may contain additional information that the manufacturer might want to provide to the user including:
- additional documents,
  - user manual
    - fixture files (personalities), for example when the fixture is used in traditional DMX mode
  - manufacturers notes
  - user notes: this can be used to record messages from the user about the device, information or warnings, for example to communicate with the rental house.
  - user tags: this can be used by the user to add/remove meta-tags on a fixture.
- device classification information
- icon/image: used to display the device in software
- control topic: a device can also optionally allow for a full status control message on this topic. This message will contain all parameter/variable combinations in a single message. The topic is relative to the Device Root Level (DRL).
- Naming
  - Shortname: for shorter display usage, limit to 10 characters
  - Longname: full name of the device Device classification—The Device Classification section of the CCF identifies the type, subtype and movement used in combination to fully classify a device.

Classifications
- device classification identifies the fixture type on the protocol implementation and can be any or all of:
  - broker
  - server
  - client
- type classification
  - light
  - laser
  - fountain
  - pyro
  - video
- subtype classification
  - For light class:
    - spot
    - beam
    - wash
    - effect
    - hybrid: a moving head that can act as both a beam & wash
    - compound: for example a Chauvet Gigbar that has multiple elements
    - pixelstrip
    - strip
    - wallwasher
    - blinder
    - strobe
    - atmospheric: smoke & haze machines
  - For video class:
    - media server
    - video wall
    - video mixer
    - video switcher
  - For pyro
    - spark
    - flame . . .
- movement classification
  - compound: offering multiple motions and/or static parts
  - moving head
  - scanner
  - accessory: for example for front-mount devices like scrollers, shutters, halo rings, . . .
  - static
  - rack: specific for rack mounted devices, as the might not need to be visualised in some server software.

Modes—The topology section of the CCF describes the mode of a device. By default, a device has a single working mode. With multiple working modes, multiple parameters can be exposed and inter parameter dependencies can be set to implement mutex behaviour across parameters. If a manufacturer does want to implement multiple modes, they can list them under the modes section. If the modes section is omitted, only a single operation mode is assumed. It is not to be advised to have a mode switch that only lives on the device and is not exposed in the file. When a user does a mode switch from the device, the device should reset and resend the RCF file. A modes list is an array of modes together with a topic on which the fixture can be asked to switch mode. When a device is asked to switch modes, the device will perform a soft reset and resent the adjusted CCF.

Topology—The topology section of the CCF describes the logical controllable elements of a device including the following sections:
- Parts: Most devices will consist out of a single 'part'. Parts normally exist in the concept of a centralized control system, like a Chauvet DJ GigBar Move. However, when a unit combines multiple devices but is only addressed as a single device, for example, the Chauvet Gigbar Move has a single power connection and also a single data connection (IP), under the improved protocol, the server software would expose the device to the user as multiple devices, in this specific case, eight devices including:
  - 2 moving heads
  - 2 parcans
  - 1 laser
  - 1 strobe
  - 2 effect flower lights
- Compounds: Compounds represent different logical sections of a device in functionality or in movement of the device components allowing the user to control subparts of a device individually as they are separate entities. Compounds exist when multiple subsections are present that expose individual parameters, but the device still needs to be controlled as a whole as well. For example, The Chauvet Rogue R1 FX-B has five individual RGBW LEDs that have individual tilt control. In accordance with the improved protocol, each of tilt sections would be a compound and the base with pan would be an additional one. As another example, the AFX 8Roll-FX has two tilting heads with each four beam outputs, however the four beam outputs share the same light source. In accordance with the improved protocol, the base and the Pan-yoke acts as a compound and each of the tilting heads acts as a compound as well. Each of the tilting compounds has four cells but are linked to the same control panel. A parameter is only used once in a compound.

Cells: Cells represent arrays of lights and are logical aperture control assignments in light sources. Cells typically can have a one-to-one link to control parameters or a many to one (for example a LED ring around a beam, a 4-lite with two control channels still has four cells defined. In addition to parts, compounds and cells, improved protocol includes the concept of Blocks, that are pre-defined sections that repeat themselves in a device.

Macros—Macros define specific actions that happen over multiple control parameters to get the device to execute a certain behaviour, for example:

locate fixture: open white at 50/50 position storage: put the position in the right storage position (for example 25/75 position with lens in)

shutdown: execute a shutdown routine (for example, max fan, no smoke for 5 min for a hazer to clean pipes)

Macros can be implemented in with a single command and the device executes the sequential steps in their respective timing, or with a sequence listed in the config file that the server needs to execute in the right order Physical—The physical section of the CCF is a JSON block that describes the physical properties of the device. By default, expressed in SI units or their derived units. This section is optional, a manufacturer can choose to provide this section or a subsection thereof. The following physical descriptors are used to describe a device:

Weight: float value in kilograms

Size: float value in meters

Width, Height, Depth

As seen from looking at the front of the device, in its natural operating mode or when multiple operation modes are possible in floor standing position. If the device doesn't have a clear front indicator either by the manufacturers logic or indication sign (arrow) the following alternatives will be used (in this order):

the side of the device containing a display the side of the device containing status indication LED's:

the side of the device containing the power connection.

Spacing: this is the minimal cuboid that fits the working envelope of the fixture. This is the best indicative dimension for fixture spacing. In Width, height, depth in meters.

Voltage range

Min Voltage: expressed in volt

Max Voltage: expressed in volt

Type: AC/DC

Min Frequency: in Hz

Max Frequency: in Hz

Power rating: expressed in Watt, this is the max power consumption of the device Emitters—The emitters section on the CCF contains all information describing the light source parameters of the fixture. The optical information (lens aperture, zoom, . . . ) are part of the cell section in the Topology section described herein. The emitters section on the CCF contains the following information:

ID, this is what is referenced in the cell section

Name, this is what is used to display to the user

Emitter type:
  Halogen
  LED
  Discharge
  Fluorescent
  Laser

Emitter manufacturer, product number, . . .

Spectral power distribution charts (at different levels)

Parameters-Within the complete configuration file, Parameters describe all of the control points of the device and are used to control a device. As devices are mechanically limited, they need to reflect the mechanics of the device. A Parameter is defined independent from the topology, each parameter is listed with an ID that is referenced by the topology, that way a parameter definition can be reused multiple times. Parameters expose a single MQTT control topic, this topic can contain multiple variables.

A parameter exists as one or more variables. For examples:

Strobe is a parameter of a device and can have the following variables
  Frequency
  Duration.
Gobo
  Slot
  Index
  Shake
  Rotation For each Parameter an MQTT topic is defined. All variables may be sent at one time to that MQTT topic. A control MQTT Topic also exists where all parameters and their variables can be sent out in a single message.

Mechanical control of a variable can either be continuous, discrete or a hybrid, allowing both modes on the same channel.

Parameters and variable can be complete or partially mutually exclusive. For examples:

to use the complete zoom range of the fixture the prism will be kicked out the strobe is done with the dimmer shutter flags, so the fixture can't dim & strobe at the same time a gobo wheel typically can't index and rotate at the same time, however often the rotation will work on topic with a first indexed position (allowing for a bar gobo to start horizontal and vertically)

Parameter Format—A parameter format is described as the following information:

A parameter name from the parameter list

A parameter class name from the parameter list

A parameter identifier

A display name for the parameter, in case for example a standardize name is "tilt" but the manufacturer uses "banking" or another name in user manuals A parameter control topic: this is the MQTT topic on which the parameter will be controlled A parameter feedback topic: this is the MQTT topic on which a device will send out its current value as well as the value requested by the server A parameter coupling: contains the links to other parameters/variables that are influenced by this parameter's value changing (any variable change causes an influence)

A list of one or more variables that belong with the parameter

Figure 4:
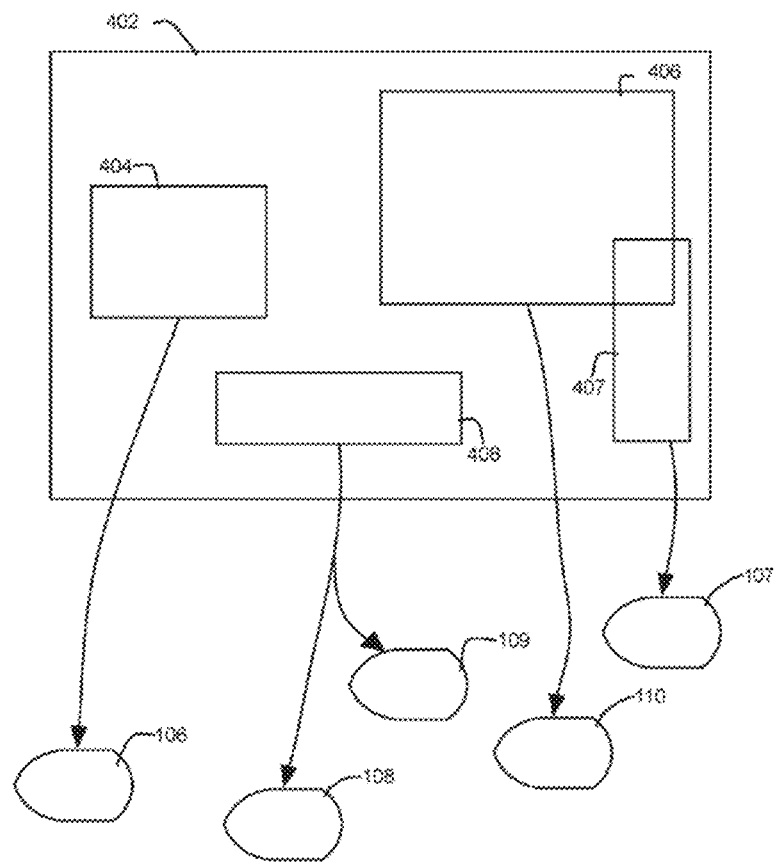
FIG. 4 illustrates conceptually an example of lighting data organization in accordance with the disclosure.

Variable—control every function of a device and have the following format:
The variable type, continuous or discrete. A continuous variable can still have discrete values assigned to it, typical example is a color wheel that can move continuous but will have a discrete value for each full color point.
Mesh identifier: if this parameter is connected to a certain aspect of the mesh (like pan/tilt, . . . ) this identifies the mesh object.
Variable coupling: this contains the links to other parameters/variables that get influenced by this variable changing.
The variable ranges:
 min value:
 max value:
 default value: the value that is taken when there is now active control, for pan/tilt for example this is typically 0 degrees.
 highlight value (optional): the value that is advised for a highlight state lowlight value (optional): the value
 step value (optional): for example a pan range that goes from −270>+270 degrees, the fixture stepper motors might only be able to execute it with a resolution of 0.01 degrees, this is the step value then. Control values get rounded by the device up to the nearest step value.
 value type (optional): this is the SI or other representation for the parameter. By default this will be taken from the parameter type, for example:
  pan/tilt in degrees
  strobe in Hz
  rotation speed in rpm
 Slot values: the list of discrete values it can take or preset values for each of the slots.
Slots—The slots section in the CCF contains all information describing discrete values can carry additional information. Some examples:
 Color filters have the name of the color, the xy Y and K values (CIE1931), the SRGB values or an image for a multi-color slot. The image is a PNG file stored on the local device file server or a link to a web location.
 Gobo images have the name and the image of the gobo in a null indexed position and can optionally have an sRGB value of the main color of the gobo. Gobo images also carry tags to describe their type. The image is a PNG file stored on the local device file server or a link to a web location. An overview:
  Name
  Image Link
  optional sRGB
  Manufacturer
  Part number
  Tags
 Prism slots have a name, type, prism number and a optical description of the prism
 Effect wheels
Geometry—The geometry section in the CCF contains all information describing either the 2D or the 3D geometry of the device. For the 2D display geometry this is split up per part, as we expect parts to be exposed to the user as separate objects. It is up to the manufacturer to convert a device into a 2D representation. The advised method is to stay as close to the real live aperture measurements of the device. The 2D representation doesn't use the compound concept of a part. Instead, the 2D display geometry directly connects to cell-ID's. For each cell-id the geometry lists (in meters):
 Coordinates in X-Y
 Shape: This should be a either a circle or an "Interior Closed Polygon" of either regular convex type or complex type. Self-intersecting polygons aren't allowed as these should be modelled as multiple cells. Only a single shape entry is allowed per cell.
  Circle: described by a radius
  Regular Convex: described by a radius and corner count which needs to be minimal 3.
  Complex: described as an ordered list of vertices. The first vertex doesn't need to be repeated at the end as a closed polygon is expected. Vertex coordinates are relative to the cell X-Y coordinates.
For the 3D display geometry, there is an optional section that points to a rigged mesh in a file. The file can either be local or a public URI. The file format may be Collada 1.5 which can be directly translated into a GL Transmission Format (gITF)
Status—The status section of the CCF describes additional optional status feedback data points that the device provides. A manufacturer can choose to provide this section or a subsection thereof. The following status data points are provided:
 Temperature: a topic on which a list of internal temperature points are put available, expressed in a float value in degrees Celsius
 Fan Speed: a topic on which a list of fan speeds are made available, expressed as an integer value in RPM
 Power: If the device measures its own power consumption, it is available on this topic, this can combine the following data points:
  Power consumption: the current power consumption in Watt as a float value
  Power Cycles: the amount power cycles the device had as an unsigned integer value
  Lamp Hours: the time the lamp was in the ON state as an unsigned integer value
  Powered Hours: the time the lamp was powered on as an unsigned integer value
Optionally a device can make this information available over SNMP to an MRTG or PRTG service. To make this clear to the server, the device only needs to set the SNMP value to true in the JSON file. If the SNMP value is omitted, a false value is assumed.
Server Config File
The server config file details the capabilities of a server. The server config file lists the following:
 ID: a GUID.
 Name: the display name of the server.
 Protocol versions: the versions that this server supports.
 IP: the IP addresses of the server
 Active/Backup: if this server is actively sending out control data or if it serves as a live backup for another
After the discovery sequence phases 202 and 204 which represents Phases 1, 2 and 3 of the disclosed protocol has completed, server 102 may build or rebuild an internal list of registered lighting devices 106, 108 and 110 during a setup or setup confirmation phase 212. After the discovery sequence, the server knows which lighting devices are available for receiving lighting data during the lighting update sequences as explained in FIG. 5.
The diagram in FIG. 4 illustrates how the complete lighting data field 402 of server 102 may be divided into zones 404, 406, 407, 408. A zone is a region or a part of the complete lighting data range generated by the server.
To increase the performance of the lighting data distribution only the relevant portion of the lighting data corresponding with zones 404, 406, 407, 408 is transmitted to each display device 106, 108, 109, 108 respectively rather than the complete lighting data for the whole field 402 to each device. In the illustrated example, data corresponding to zone 404 is transmitted to display device 106, data corresponding to zone 408 is transmitted to lighting devices 108 and 109, and data corresponding to zone 406 is transmitted to display device 110. In order for this to occur, server 102 has to calculate and prepare the lighting data for each individual display device, based on the negotiated properties and settings for that display device. As a consequence, the calculation and processing power is centralized in server 102, enabling the display device to be a less powerful device with little processing capabilities.

Each of the lighting devices 106, 107, 108, 109 and 110 is allocated to receive data corresponding to one of the zones 404-408. A zone may be allocated to more than one display device, but in the preferred embodiment a display device only receives lighting data corresponding to one zone.

Figure 5:
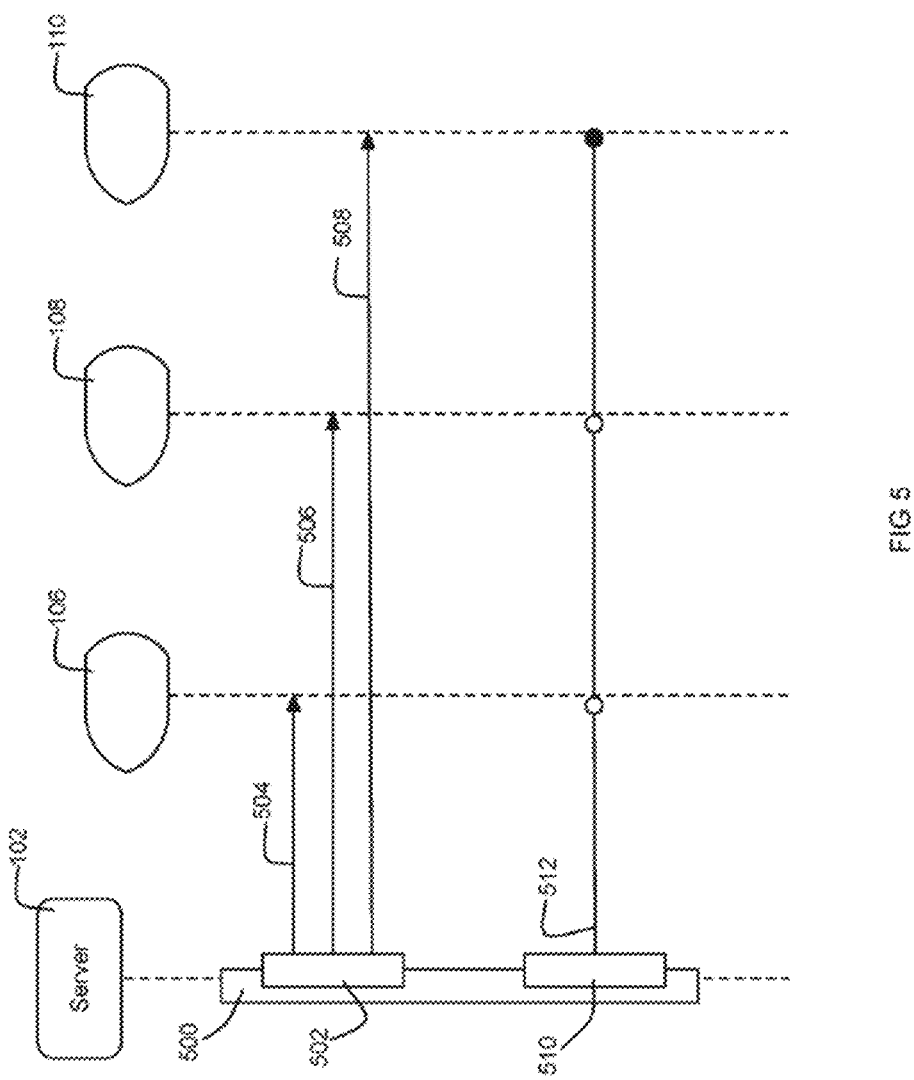
FIG. 5 illustrates conceptually a sequence diagram of the lighting data distribution process in accordance with the disclosure.

FIG. 5 illustrates the distribution sequence of the lighting data. Lighting data is addressed and transmitted from server 102 to lighting devices 106, 107, 108, 109 and 110 using a point-to-point network connection. In the embodiment shown each display device 106, 107, 108, 109 and 110 receives only the portion of the lighting data that it should display. This means that each display device only gets the lighting data that it actually needs. This ensures maximum efficiency in the network while the protocol can be kept small and tidy without much overhead in the lighting data distribution process.

In a first phase 502, server 102 generates lighting data 504, 506, 508. Depending on the configuration and the allocation of lighting data and zones, the subset of lighting data is created for each device with only the necessary lighting data. The supplied lighting data depends on the zone assigned to the display device, the color components, the compression and the pixel mapping that is used. Server 102 then sends that lighting data to each individual display device, using a buffer message 504, 506, 508. This means that lighting devices 106-110 each get their specific part of the lighting data that they need to show. The lighting devices 106, 108 and 110 do not receive the complete lighting data, but only the part that they actually need.

In the embodiment shown, lighting devices 106, 108 and 110 need not acknowledge or confirm the received data, but can for closed loop control on their own respective status topics. The protocol may depend on the inherent error handling capabilities of a TCP/IP layer (or similar analog in other communication protocols) to handle any errors in the transmission.

In the next phase 510, after the lighting devices 106, 108, 110 receive lighting data, server 102 may broadcast a present message 512 to all the lighting devices 106, 108, 110, so that they can update their displays with the new lighting data in a coordinated and synchronized manner.

Examples of lighting devices that may be categorized in accordance with the improved protocol described herein include those listed in the following Table 1.

TABLE 1

| Brand | Product | type | subtype | movement |
|---|---|---|---|---|
| Chauvet | SlimPar Pro | light | wash | static |
| AmericanDJ | Allegro Z6 | light | strip | moving head |
| ETC | Source Four Series3 LED | light | spot | static |
| Showven | Sparkular Spin | pyro | spark | moving head |

TABLE 1-continued

| Brand | Product | type | subtype | movement |
|---|---|---|---|---|
| Arkaos | MediaMaster | video | media server | rack |

In the examples above, the device manual may be provided both by giving the link to the local location on the device file server and as well as the URI location on the web.

Figure 3:
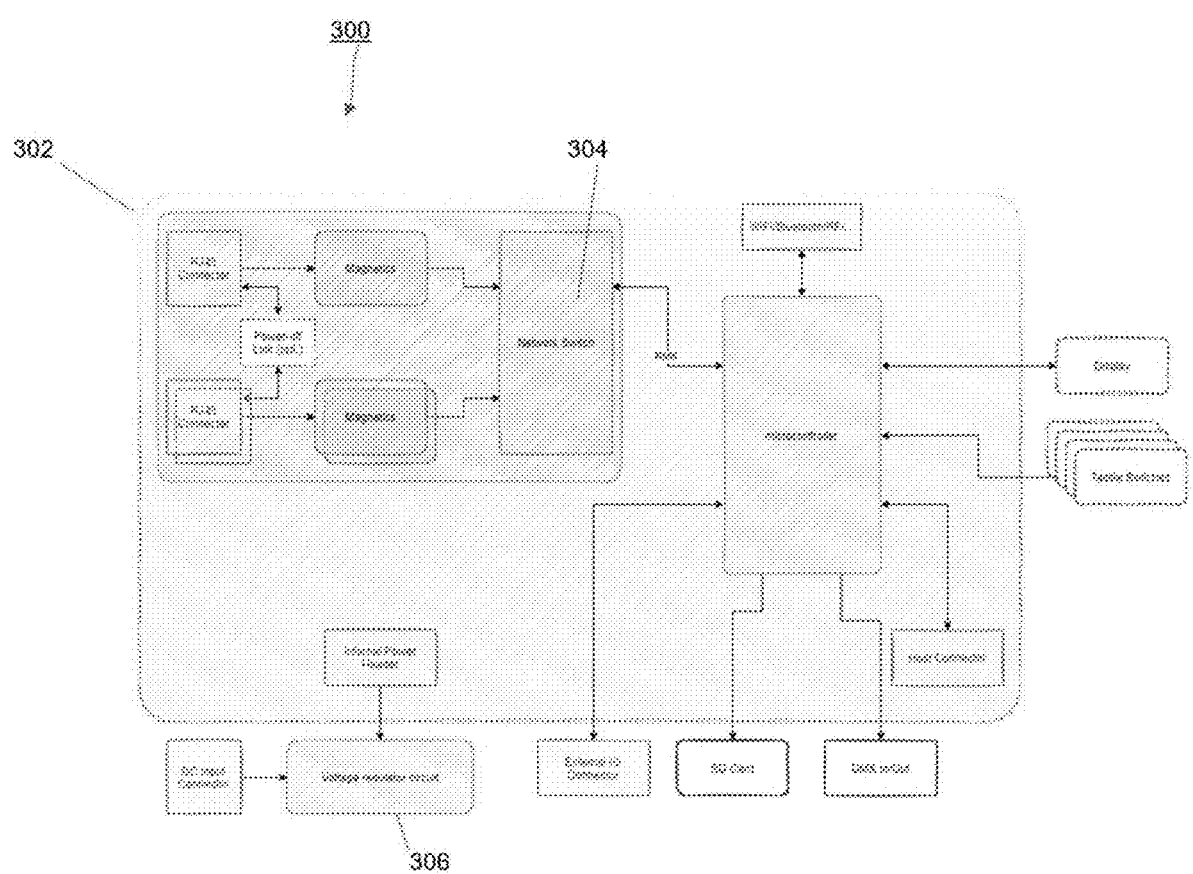
FIG. 3 illustrates conceptually a block diagram of a processor useful in implementing the protocol in accordance with the disclosure.

In accordance with another aspect of the improved protocol, a manufacturer note section is provided for any notes the manufacturer wants to give to the user. The type of the notes (both manufacturer & user) sets the behaviour:
  info: is passively present for the user to read
  warning: creates a pop up when the device is added/found to inform the user The user topic is where to a user can send notes to be added. When a message is send to this topic, the device adds it to the CCF with a username & timestamp. As this is part of a section that the manufacturer can optionally support, they also can decide the length of the buffer. Notes are added in a round robin buffer with the buffer size given to the user. The advised size of the note string is 200 characters maximum. Notes can be used to:
  communicate issues to the rental house renting out the device
  following up who has used it last Hardware Implementation Lighting devices adhering to the improved lighting protocol described herein may include the controller 300 illustrated in the block diagram of FIG. 3 whether built directly into the device at the time of manufacture or provided as a plug in board. As illustrated in the controller comprises a network connector 302, microcontroller 304, internal power header 306 and various other connectors, as illustrated. In embodiments, network connector 302 may comprise a pair of RJ45 network jacks, with either integrated or external magnetics, an optional Power-off link through system, and a network switch with direct RMII link to the microcontroller 304. The internal power header 306 provides the voltage needed for the board (3.3V, 5V, . . . ) which comes from the host device (parcan, moving light, . . . ) assuming the host device has a Power Supply Unit with (multiple) voltage rails available. The microcontroller 304 a be implemented with any number of commercially available logic elements. The optional SD-Card (or other non-volatile storage) is intended to store the configuration files as well as to show the working with additional files like gobo images, 3D meshes, etc. The optional DMX Connection is intended to control a 'regular' DMX moving head as if it is a protocol device to the console. Due to timing constraints and refresh overhead an additional microcontroller may be required to run the DMX protocol, with an asynchronous interface to the main processor. Optional OLED display and Tactile Switches is to create an onboard menu for debugging/setup/.

Example 1

An exemplary implementation of the disclosed lighting protocol is set forth herein with reference to the KlingNet 3 protocol commercially available from ArKaos, S. A., Waterloo, Belgium (hereafter referred to as "KlingNet 3" of "KN3").

Figure 6:
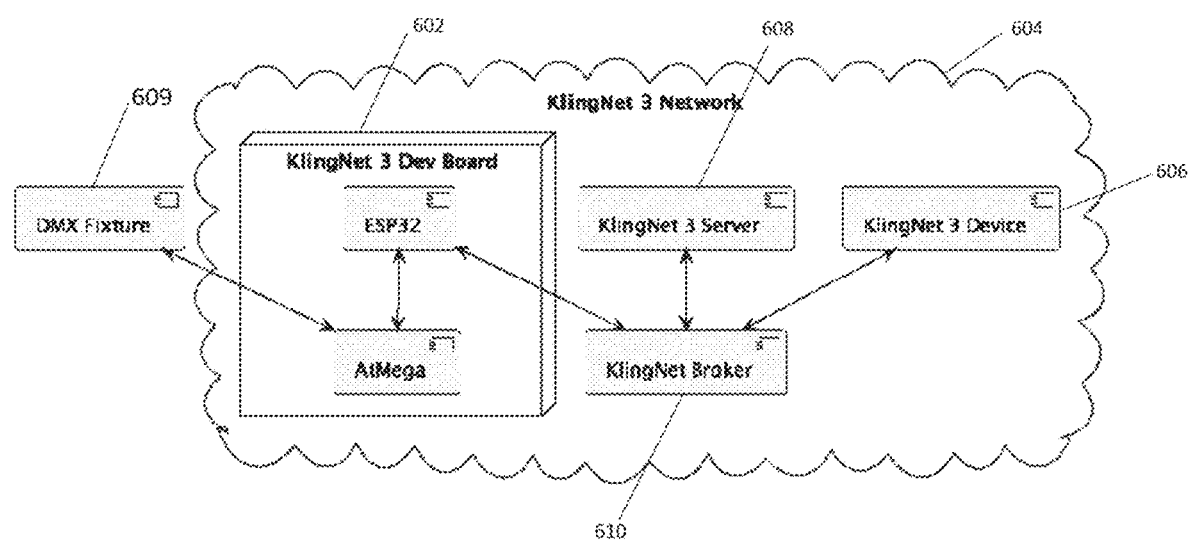
FIG. 6 illustrates an exemplary embodiment of a networked set-up of control server and fixture devices according to the KlingNet 3 protocol.

Referring to FIG. 6, an illustrative example is provided of a network configuration utilizing the improved protocols. Server 602 may be a computer or any other physical or logical device that produces real-time lighting data that can be displayed by a lighting device. The server 602 on the KlingNet network generates control data for devices and may be implemented as a Light Control system or Pixel-mapping media server. In Example 1, server 602 a KlingNet 3 Development Board is an embedded system that acts as a KlingNet 3 Device in the end can be configured as an LED device, a DMX fixture, or a generic KlingNet 3 Device. The KlingNet 3 Development Board contains two microprocessors: ESP32 and AtMega328pb. The ESP32 microprocessor is responsible for implementing KlingNet 3 Protocol on KlingNet 3 Dev Board. All functionality related to KlingNet 3 Network protocol and corresponding config files are stored and accessed from this system. The software package targeted for this board is related as klingnet-app. The AtMega328pb processor is responsible for communicating with DMX fixtures (if operating in DMX fixture mode) or with LED panels (if operating in LED device mode). The software package targeted for this board is related as klingnet-mcu.

Lighting devices 606, 608, 609 and 610 are physical devices that are capable of converting lighting data to a visual representation and may be selected from a list including but not limited to: LCD screens, lighting projectors, LED screens, lighting fixtures. The server 602 is connected using a wired or wireless connection to a network 604. Devices 606, 608, 609 and 610 are also connected to the network 604 in a wired or wireless manner. The network 604 may be any computer network based on the IP network protocol stack. In order to communicate with each other, the server 602 and the devices 606, 608, 609 and 610 are preferably configured in the same network range. As is well known in the art, this can be done using static IP addresses or using a dynamic IP addressing system such as DHCP. A network component such as a router, a network switch or any other network device or service can be used to build the network. In Example 1, device 610 serves as a broker device in accordance with the KlingNet 3 protocol. Device 608 is another server device in accordance with the KlingNet 3 protocol and devices 606 and 609 are fixture devices.

Figure 7:
FIG. 7 illustrates conceptually a sequence diagram of the device discovery process in accordance with the KlingNet 3 protocol.

Detecting new KlingNet 3 devices is done with sending an empty message on/devices/ping topic. All KlingNet 3 devices subscribe to this topic. Once the message is received by KlingNet 3 device, the response is sent. The device responds with Reduced Config File (RCF) publishing on/devices/announce (RCF). After KlingNet 3 server receives RCF message, an <DRL>/ping is posted and the KlingNet 3 device replies with posting its Complete Config File (CCF) on <DRL>/config and its subtopics. FIG. 7 illustrates the communication sequence of the discovery phase initiated by server 602 in search of connected lighting devices. Server 602 broadcasts a discovery message (/devices/ping) over the network. Upon receipt of discovery message, device 606, answers with a restricted configuration file (device/announce (RCF)), as illustrated. Thereafter, server 602 broadcasts discovery message (<DRL>/ping) over the network and, upon receipt thereof, device 606, answers with a complete configuration file (<DRL>/config), and its subtopics, e.g. information, technology, physical, emitters, status, and parameter data, as illustrated. In Example 1, the communications between the server 602 and device 606 occur through broker device, however, that communication may occur directly under the KlingNet 3 protocol without the use of broker device 610.

When a KlingNet 3 device changes its configuration, it is required to post new config to the KlingNet 3 server. This is done by posting on <DRL>/config and its subtopics without KlingNet 3 Server sending <DRL>/ping first. A KlingNet 3 device may change its configuration in response to <DRL>/mode or <DRL>/fixture_id topic from the KlingNet 3 server, the KlingNet 3 device response to either of these being the same as <DRL>/config in its subtopics as illustrated in FIG. 7.

Figure 8:
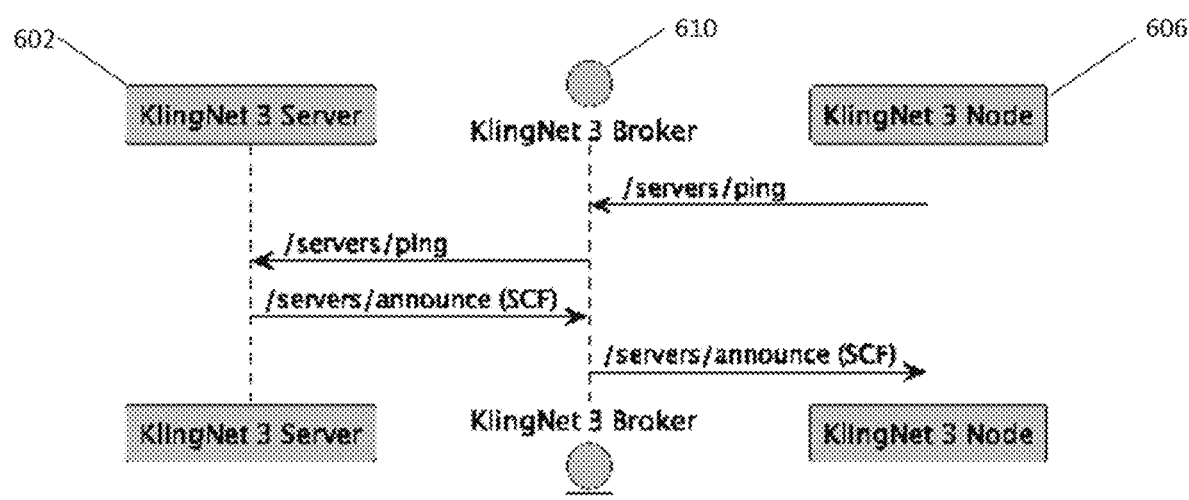
FIG. 8 illustrates conceptually a sequence diagram of the server discovery process in accordance with the KlingNet 3 protocol.

Detecting new KlingNet 3 servers is done with/servers/ping message. Once the message is published every KlingNet 3 server is required to respond with publishing on/servers/announce (SCF). The content for this topic is JSON encoded Server Config File (SCF), as illustrated in FIG. 8.

Figure 9:
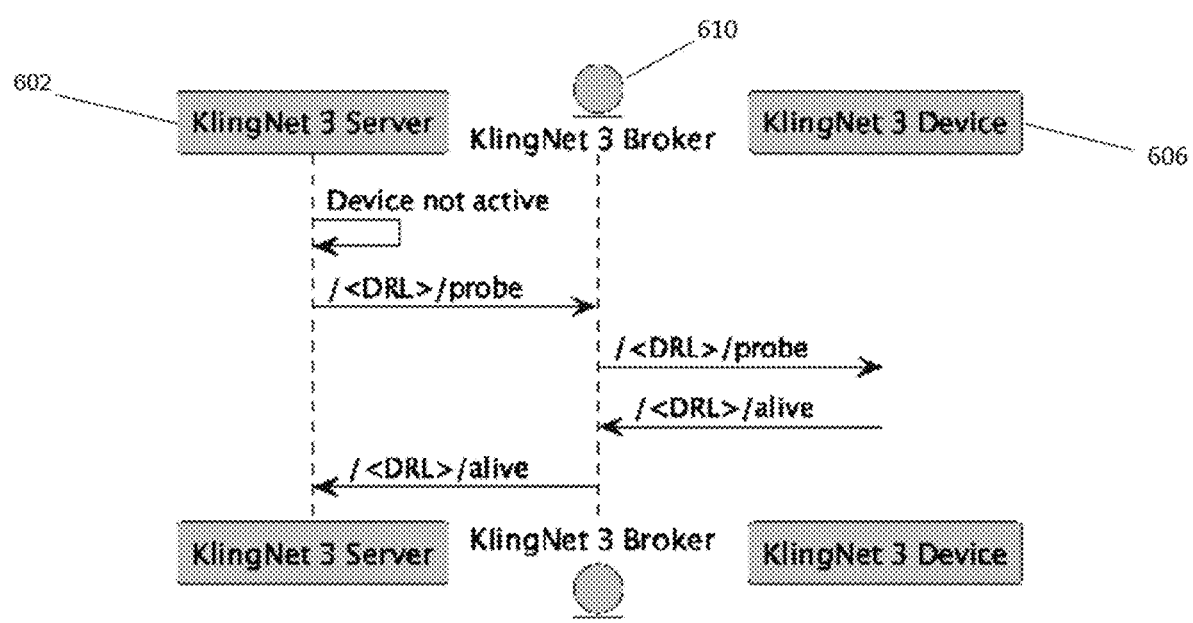
FIG. 9 illustrates conceptually a sequence diagram of the status process in accordance with the KlingNet 3 protocol.

The KlingNet 3 Server will use <DRL>/probe topic to verify if a device is still present and connected to KlingNet 3 network. The <DRL>/alive message sent from KlingNet 3 Device to inform the KlingNet 3 Servers that the device is alive and well. Posting on this is occurs after receiving <DRL>/probe. As illustrated in FIG. 9, the algorithm implemented in KlingNet 3 Server is following:

If a device has not sent anything for 10 seconds a <DRL>/probe message is posted.

A device is required to response on <DRL>/alive topic within 3 seconds.

If the <DRL>/alive message is not received a device is considered to be lost and is not available in the KlingNet 3 Reference Server anymore.

Parameters in a Complete Configuration File are used to control a device. As devices are mechanically limited, they need to reflect the mechanics of the device. A Parameter is defined independent from the topology, each parameter is listed with an ID that is referenced by the topology, that way a parameter definition can be reused multiple times.

Parameters may be updated with Immediate mode or Synchronized mode. Immediate and Synchronized modes work on parameter level: a KlingNet 3 Device may support parameters that are working in immediate mode and other parameters that are working in synchronized mode.

Figure 10:
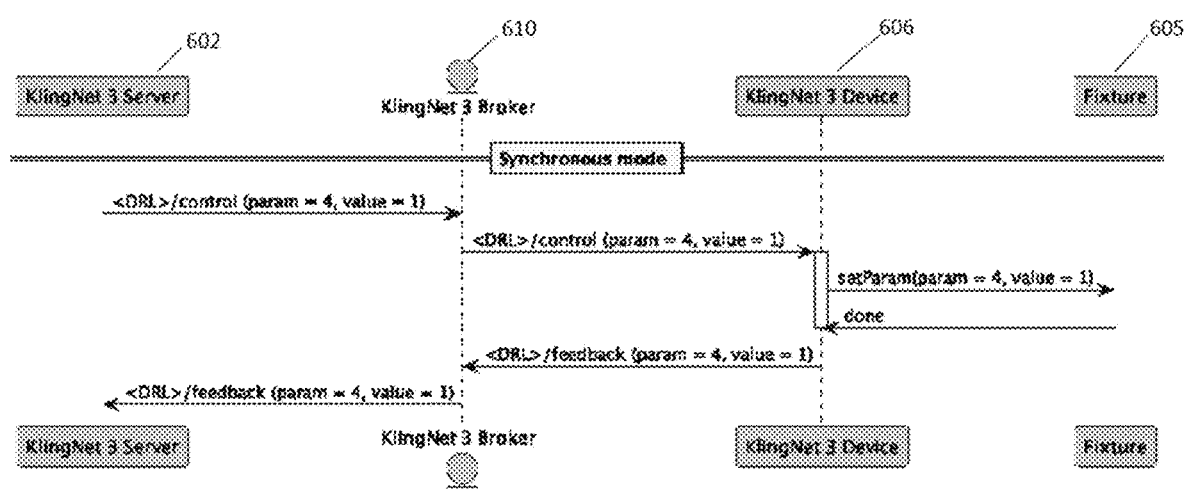
FIG. 10 illustrates conceptually a sequence diagram of a parameter change process in accordance with the KlingNet 3 protocol.

By default all parameters in all KlingNet 3 Devices are used in immediate mode: once a new value for parameter is requested by posting on <DRL>/control the KlingNet 3 Device should apply the change. In immediate mode KlingNet 3 Device is required to post message on <DLR>/feedback topics after parameter has been updated, as illustrated in FIG. 10 where sub-device 605 is an independently addressable fixture of device 606.

Figure 11:
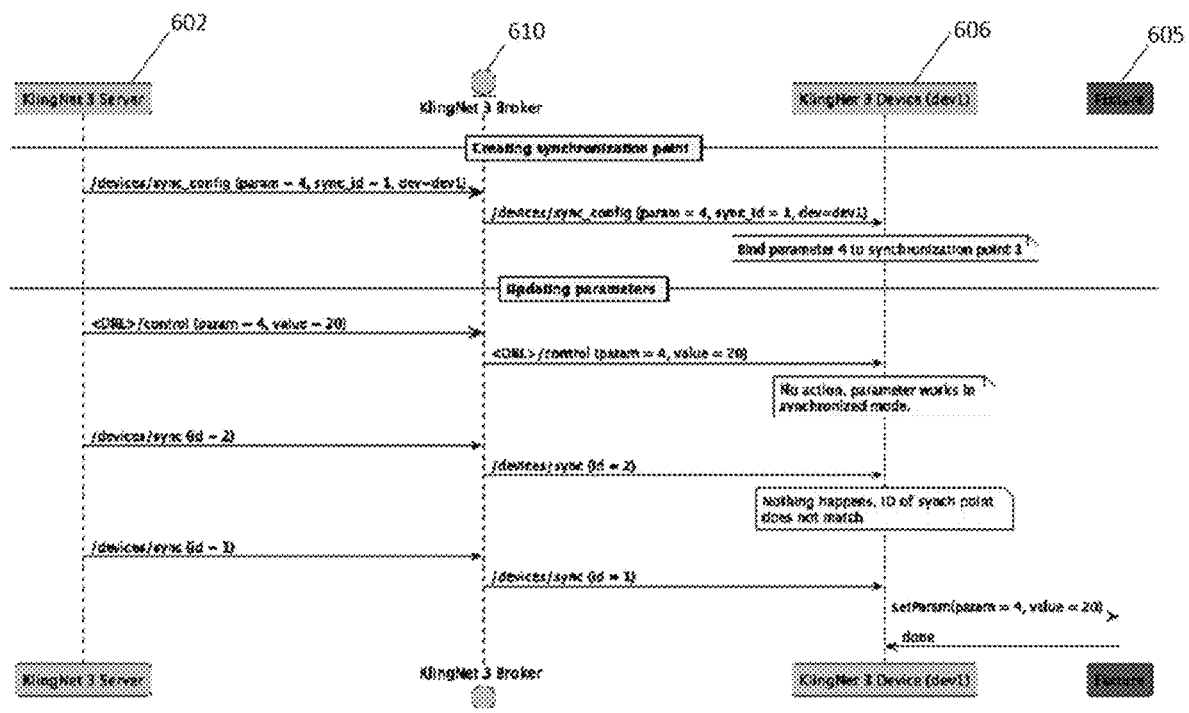
FIG. 11 illustrates conceptually a sequence diagram of a parameter change process in accordance with the KlingNet 3 protocol.

Synchronizing parameters is done with in synchronized mode which allows for multiple KlingNet 3 devices to set parameters values simultaneously, as illustrated in FIG. 11 where sub-device 605 is an independently addressable fixture of device 606. The KlingNet 3 User creates at least one synchronization point. After synchronization points are created, bound parameters are no longer set immediately after receiving message on <DRL>/control. Once a user creates a synchronization point via synchronization configuration and binds parameter(s) to the synchronization point the bound parameters work in Synchronized mode. Using this feature allows for scenarios where synchronization is necessary between KlingNet 3 Devices. An example would be a video wall, or multiple LED strips that share the same scenario.

The <DRL>/notes topic enables devices to post their information/warning/error notes. All notes are enqueued by the device (where hardware allows) for later retrieval. In addition warning and error notes are published at the time they are raised. These notes can be forwarded directly to the user. A note should be sent only once. A device can post multiple notes at once in an array format. Notes have a classification by severity, as follows:

Info: Information that needs to be reported in order for an action to be undertaken or for the correct operation of the device.

Warning: Something is escalating leading to a broken/malfunctioning state

Error: Something is broken

Errors have a UNIX timestamp in milliseconds (where supported by hardware). The note originator is identified by device GUID.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and, accordingly, all suitable modifications and equivalents falling within the scope of the disclosure may be resorted to.

Computer programs, program modules, and code based on the written description of this specification, such as those used by the microcontrollers, are readily within the purview of a software developer. The computer programs, program modules, or code can be created using a variety of programming techniques. For example, they can be designed in or by means of Java, C. C++, assembly language, or any such programming languages. One or more of such programs, modules, or code can be integrated into a device system or existing communications software. The programs, modules, or code can also be implemented or replicated as firmware or circuit logic.

Another aspect of the disclosure is directed to a non-transitory computer-readable medium storing instructions which, when executed, cause one or more processors to perform the methods of the disclosure. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Moreover, while illustrative embodiments have been described herein, the scope of any and all embodiments include equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

While the disclosure has been described with respect to a limited number of embodiments, those skilled in the art, having benefit of this disclosure, will appreciate that other embodiments may be devised which do not depart from the scope of the disclosure as disclosed herein. It should be understood that various changes, substitutions and alterations can be made hereto without departing from the spirit and scope of the disclosure as described by the appended claims.

What is claimed is:

1. An auto configuring lighting control system comprising:
    a plurality of devices operatively coupled over a network infrastructure, the plurality of devices each configured to operate in a zero configuration mode and further configured to store:
        a restricted configuration file containing data identifying a device of the plurality of devices, and
        one or more complete configuration files containing data identifying the device and one or more controllable parameters that control performance of the device, and
    wherein a first device of the plurality of devices is configured as a server source of control data and content data for other devices of the plurality of devices, wherein the first device of the plurality of devices configured as the server source periodically requests each of the other devices of the plurality of devices to provide a respective restricted configuration file and complete configuration file,
    wherein at least one of the other devices of the plurality of devices comprises a multifunction device having multiple separately controllable sub-devices associated therewith, each sub-device having respective one or more controllable parameters, wherein a complete configuration file of the multifunction device contains data identifying the respective one or more controllable parameters of each separate sub-device associated with the multifunction device.

2. The auto configuring lighting control system of claim 1, wherein a restricted configuration file of the at least one multifunction device contains data identifying each separate sub-device associated with the multifunction device.

3. The auto configuring lighting control system of claim 1, wherein the other devices of the plurality of devices provide their respective restricted configuration files to the server source upon an occurrence of any of; power on, reboot, reset, hardware configuration change, mode change, setting directly on display of a respective device, or software change to the respective device.

4. The auto configuring lighting control system of claim 1, wherein the server source stores descriptive information regarding operational characteristics of a device directly in memory associated with the device, which information is retained within the device after disconnection from the network infrastructure.

5. The auto configuring lighting control system of claim 4, wherein the descriptive information is stored in the memory associated with the device and comprises any of optical files, user notes, user tags, and error/defect descriptions.

6. The auto configuring lighting control system of claim 1, wherein the other devices of the plurality of devices comprise any of: a light device, parcan, moving head, laser system, smoke machine, video wall, projector, pyro-technic device, or fountain device.

7. The auto configuring lighting control system of claim 1, wherein the server source comprises any of; light control system or pixelmapping media server.

8. An auto configuring lighting control device comprising a processor and a non-transitory computer-readable storage medium storing instruction that, when executed by the processor, cause the processor to perform a method, the method comprising:
store a restricted configuration file containing data identifying the auto configuring lighting control device,
store one or more complete configuration files containing data identifying the auto configuring lighting control device and one or more controllable parameters that control performance of the auto configuring lighting control device,
provide the restricted configuration file to a server process automatically upon an occurrence of any of power on, reboot, reset, hardware configuration change, mode change, or software change to the auto configuring lighting control device, and
provide the restricted configuration file to the server process upon receipt of a query from the server process,
wherein the auto configuring lighting control device comprises a multifunction device having a plurality of separately controllable sub-devices associated therewith, each sub-device having respective one or more controllable parameters, wherein the complete configuration file contains data identifying the respective one or more controllable parameters of each separate sub-device associated with the multifunction device.

9. The auto configuring lighting control device of claim 8, wherein the restricted configuration file contains data identifying each separate sub-device associated with the multifunction device.

10. The auto configuring lighting control device of claim 8, wherein the sub-devices comprise any of: a light device, parcan, moving head, laser system, smoke machine, video wall, projector, pyro-technic device, or fountain device.

11. The auto configuring lighting control device of claim 8, wherein the method further comprises:
storing descriptive information regarding operational characteristics of the auto configuring lighting control device directly in memory associated with the auto configuring lighting control device, which information is retained by the auto configuring lighting control device after disconnection from a network infrastructure.

12. The auto configuring lighting control device of claim 8, wherein the method further compromises:
enabling operation of the multifunction device or any of the plurality of separately controllable sub-devices operatively coupled to a network infrastructure through either a wired and wireless connection, based on a relative position thereof.

13. An auto configuring lighting control system comprising:
a plurality of devices operatively coupled over a network infrastructure, the plurality of devices each configured to operate in a zero configuration mode,
a first device of the plurality of devices is configured as a server source of control data and content data for other devices of the plurality of devices,
at least one of the other devices of the plurality of devices comprises a multifunction device having multiple separately controllable sub-devices associated therewith, each sub-device having a respective one or more controllable parameters, wherein a complete configuration file of the multifunction device contains data identifying the respective one or more controllable parameters of each separate sub-device associated with the multifunction device,
wherein the server source is capable of controlling at least one parameter that controls performance of one of the multiple separately controllable sub-devices independently of other sub-devices of the multiple separately controllable sub-devices.

14. The auto configuring lighting control system of claim 13, wherein at least one of the other devices of the plurality of devices comprises any of: a light device, parcan, moving head, laser system, smoke machine, video wall, projector, pyro-technic device, or fountain device.

15. The auto configuring lighting control system of claim 13, wherein the server source comprises a device operatively connected to a local network or a wide area network or both simultaneously.

* * * * *